United States Patent

Horton

[11] Patent Number: 5,176,388
[45] Date of Patent: Jan. 5, 1993

[54] FLEXIBLE SIDE WALL CONSTRUCTION FOR CARGO VEHICLES

[75] Inventor: Terry F. Horton, Whittier, Calif.

[73] Assignee: Utility Trailer Manufacturing Company, City of Industry, Calif.

[21] Appl. No.: 802,900

[22] Filed: Dec. 6, 1991

[51] Int. Cl.⁵ .............................................. B60J 5/06
[52] U.S. Cl. ................................. 296/155; 296/181; 296/183; 296/138; 160/84.1; 160/348
[58] Field of Search ............... 296/138, 155, 181, 183; 160/84.1, 348; 410/130

[56] References Cited

U.S. PATENT DOCUMENTS

| | | | |
|---|---|---|---|
| 1,568,529 | 1/1926 | Poloskie | 296/138 |
| 2,868,286 | 1/1959 | Odermann | 160/348 |
| 4,545,611 | 10/1985 | Broadbent | 296/181 |
| 4,762,361 | 8/1988 | Horton et al. | 296/181 |
| 4,795,208 | 1/1989 | Whiteman | 296/181 |
| 4,826,236 | 5/1989 | Bennett | 296/181 |
| 4,943,110 | 1/1990 | Pastva | 296/181 |
| 4,952,009 | 8/1990 | Mountz et al. | 296/181 |

FOREIGN PATENT DOCUMENTS

89/00934 2/1989 PCT Int'l Appl. .............. 296/181

Primary Examiner—Dennis H. Pedder
Attorney, Agent, or Firm—Lyon & Lyon

[57] ABSTRACT

A flexible side wall construction for cargo vehicles that can be slidably opened by a sliding cargo door providing access to the cargo area of the vehicle. The flexible side wall may be compactly folded increasing the user's access to the cargo area of the vehicle. A plurality of connected panels of the flexible side wall include a series of primary poles, horizontally spaced along the flexible side wall. These panels further include upper and lower spring loaded intermediate poles affixed within intermediate pockets which are biased to cause the flexible side wall to fold in an orderly, pleated fashion. The pleated arrangement allows a weather sealing pelmet to properly function when the flexible side wall is fully lengthened or in a compacted position.

7 Claims, 4 Drawing Sheets

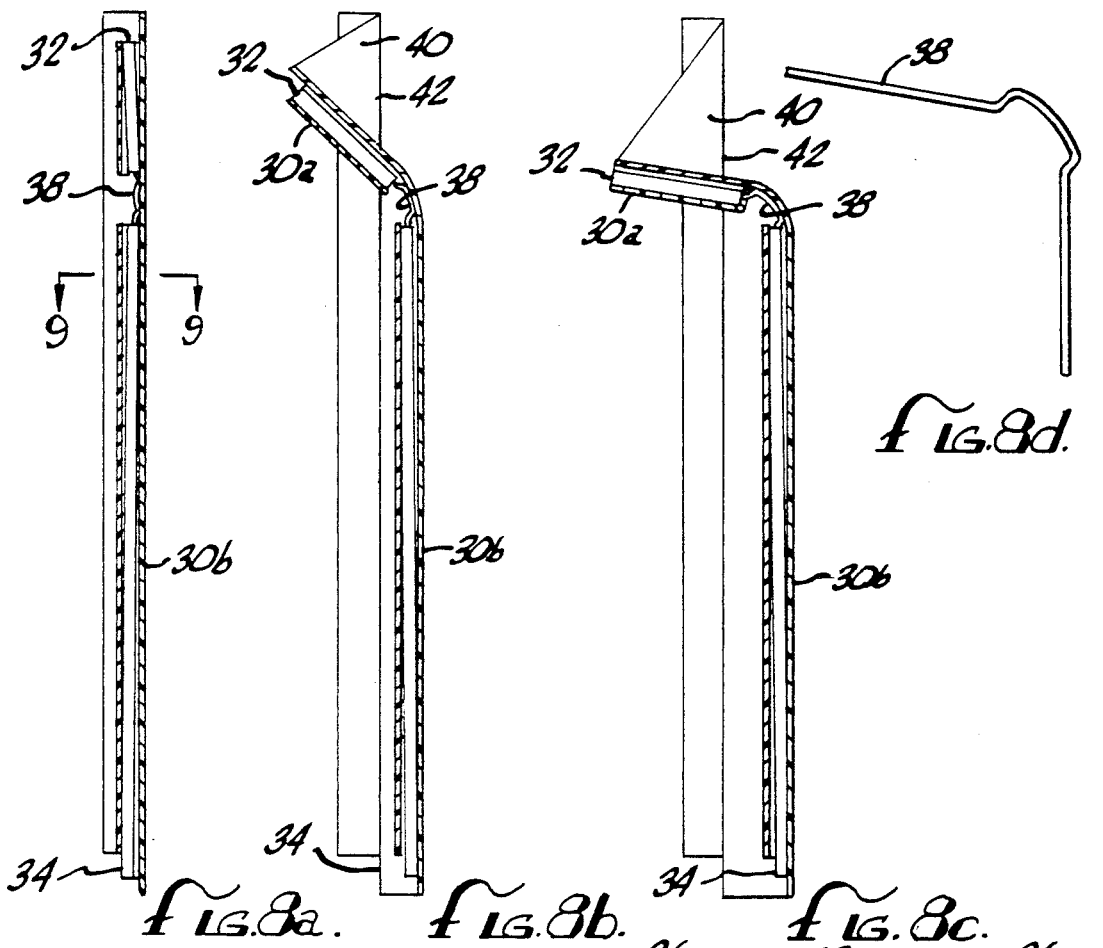
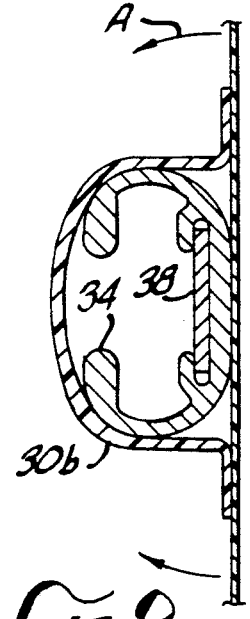
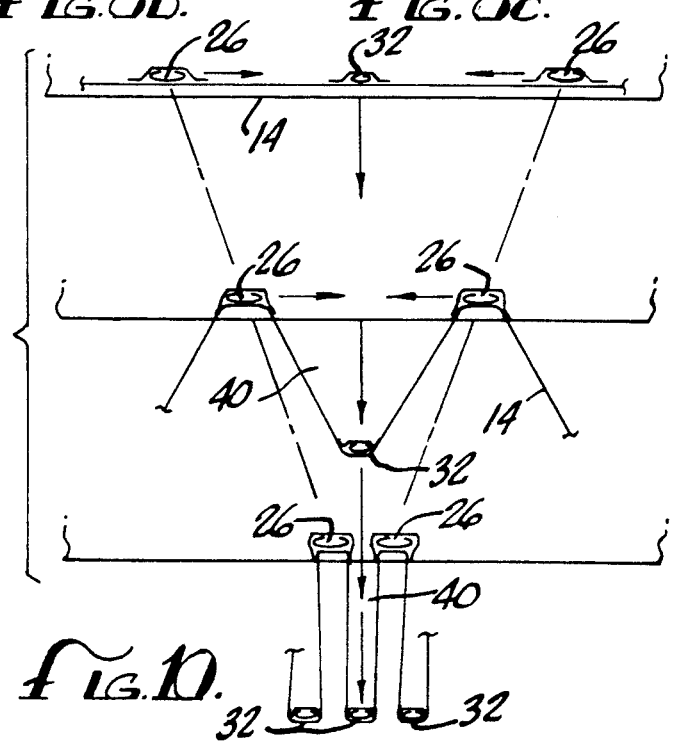

FLEXIBLE SIDE WALL CONSTRUCTION FOR CARGO VEHICLES

The present invention relates to cargo carrying vehicles with an open side in the cargo area which is selectively closed by a flexible side wall. Flexible-sided vehicles have long been desired by those in the cargo carrying industry. It is, of course, desirable to have the flexible side open as far as possible to allow maximum access to the cargo area. Thus, it is desirable that a flexible side wall be compacted or folded to a very compact position to allow access to the greatest possible length of the cargo area of the vehicle. It is also desirable to have the flexible wall fold within the weather seal strip or pelmet at the top edge of the open side.

One arrangement for a flexible curtain sided vehicle is described in U.S. Pat. No. 4,545,611. That patent describes upper and lower horizontal biasing strips to urge the upper and lower portions of the curtain to fold in a predetermined manner. However, these horizontal biasing strips prevent the curtain from being folded in a completely compact position because the horizontal biasing strip causes the curtain to fold on a large horizontal radius. The curtain folding at the top is random and uncontrolled because the folding of the curtain above the upper biasing strip is uncontrolled. The user does not have convenient access to a significant portion of the cargo area because of the non-compacted folding of the flexible curtain. Also, there are no provisions to cause the curtain and pelmet to seal at the top and thus the pelmet does not function as intended. This uncontrolled fold is not only unsightly, but also a hazard to weather-tightness.

Another flexible curtain arrangement for a cargo vehicle is described in U.S. Pat. No. 4,762,361. That patent discloses a biasing hinge device which is also horizontally attached to a flexible curtain. However, this also suffers from some of the same drawbacks as the devices described in the 4,545,611 patent. As general background of the present invention, these patents are incorporated herein by reference.

It is an object of the present invention to provide a flexible side wall construction for cargo vehicles which has improved folding characteristics over the prior art. The flexible side wall construction disclosed herein normally is used in conjunction with one or more slidable doors to greatly improve user access to vehicle cargo areas. When access to the cargo area of the vehicle is desired, the door or doors are unlatched and slid along a portion of the vehicle, opening up the cargo area. These doors, when closed, provide a horizontal tension force on the flexible side wall providing a substantially flat wall for minimizing billowing and flapping of the curtain when the vehicle is traveling at high speeds.

The system of this invention forces the flexible side wall into an orderly pleated fashion by controlling all fold lines in a novel manner. The flexible side wall is divided into panel sections by horizontally spaced primary poles. Within each panel are spring loaded intermediate vertical poles, which force an upper stiffener portion of the panel to fold inward when the flexible side wall is pushed to a compacted position. The upper edge of the flexible wall never moves outside of the pelmet, which permits the pelmet to function as intended providing a positive 2-inch to 3-inch overlapping weather seal.

The present invention uses no horizontal biasing strips as described in the aforementioned U.S. Pat. No. 4,545,611, but instead uses these intermediate poles which are vertically positioned between adjacent primary poles. The curtain reinforcement or overlay seams that cross fold lines in the prior art are eliminated, and the upper and lower ends of the intermediate poles are not connected to the roof or floor of the cargo vehicle. A biasing spring means connecting the intermediate poles forces the top edge of the curtain inward and urges the bottom portion outward into a compact "pleat" when the slidable door or doors are released. When folded, the flexible side wall is compacted into a pleated compact shape. This allows greater access to the cargo area.

An upper stiffener portion is provided by reinforcing a triangular shaped portion of the flexible side wall with an extra layer or layers of the material. This creates biased fold lines which allow the uniform pleated fold.

Another embodiment utilizes modified primary pole pockets which are substantially rounded for the primary poles. The cross-sectional shape of the pocket enhances the ability of the flexible wall to wrap tightly around the primary pole. This substantially rounded pocket is of a deep hat shape with sufficient depth to allow it, when in a folded position, to wrap around the primary pole without the flexible wall being folded between the primary pole and the sleeve. This also permits a compact folding of the flexible side wall and does not hamper the effectiveness of the pelmet. The intermediate pockets are similarly constructed to also wrap around their respective poles. A hem is provided near the base of the flexible side wall to ensure a stronger seal at the bottom. This hem is made of an extra layer or layers of the material.

Accordingly, the overall object of the present invention is to provide an improved flexible side wall construction for cargo vehicles but other and more detailed objects and advantages will appear to those skilled in the art from the following description and the accompanying drawings, wherein:

FIG. 8a is a section view taken through the intermediate poles.

FIG. 8b illustrates the movement of the intermediate poles during the compacting of the flexible side wall.

FIG. 8c illustrates the compacted position of the flexible side wall at the intermediate poles.

FIG. 8d is an enlarged elevation view of the biasing spring means shown in FIGS. 8a, 8b and 8c.

FIG. 9 is an enlarged section view through the lower portion of the intermediate pole along line 9—9 in FIG. 8a.

FIG. 10 is a plan view illustrating, schematically, the compacting sequence for the flexible side wall.

DETAILED DESCRIPTION OF THE PREFERRED EMBODIMENT

Figure 1:
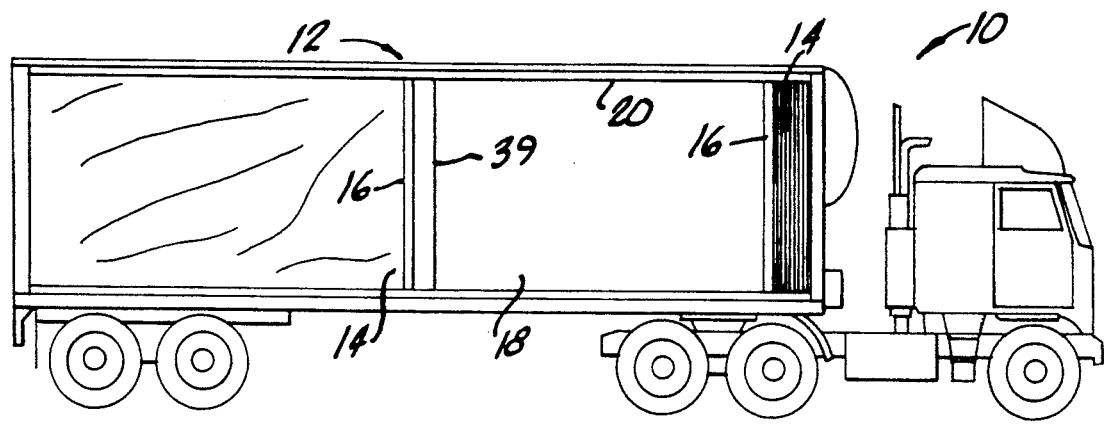
FIG. 1 is a side view of a cargo vehicle with one of the two slidable doors in a closed position and the other door in an open position.
Figure 2:
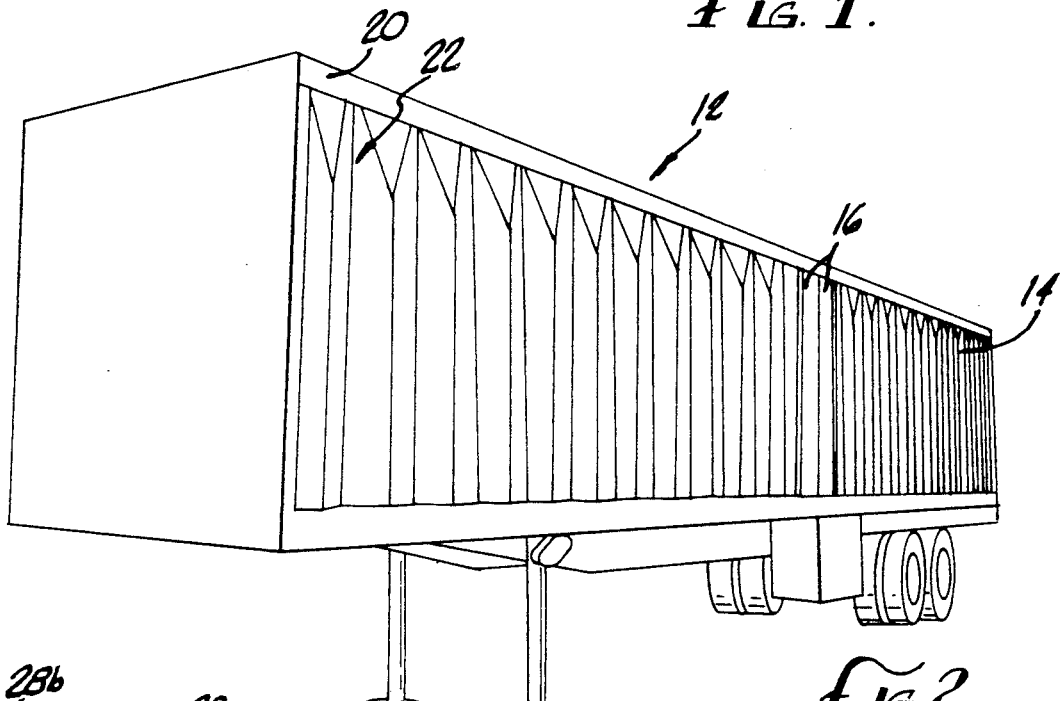
FIG. 2 is a perspective view of the cargo section with the flexible side wall extended with the pleat lines exaggerated for illustration purposes.

Referring to the figures, a cargo vehicle 10 is shown in FIG. 1 with its trailer or cargo area 12 having the forward one-half of the flexible side wall 14 opened by one of the two slidable doors 16. The opening 18 in the side of the cargo area 12 is also illustrated. The flexible side wall 14 is shown fully closed in FIG. 2 which illustrates the position of the two slidable doors 16 when positioned adjacent each other at the middle of the cargo area 12. The folds are exaggerated for purposes of illustration when, in fact, in the closed condition shown in FIG. 2 and properly tensioned, the flexible side wall 14 will be substantially flat. As can be seen from the Figures, the pelmet 20 extends downwardly over the outside of the flexible side wall 14 at all times to serve its intended function as a weather sealant in this invention. The series of panels 22 which comprise the flexible sidewall 14 are further illustrated in FIGS. 3 and 4.

Figure 3:
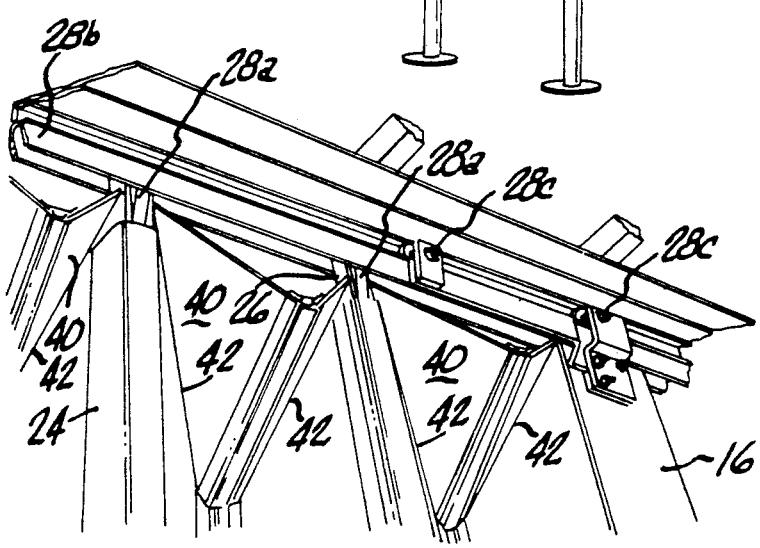
FIG. 3 illustrates a view of the support system for the flexible side wall and the slidable door, shown from the interior cargo area.
Figure 5:
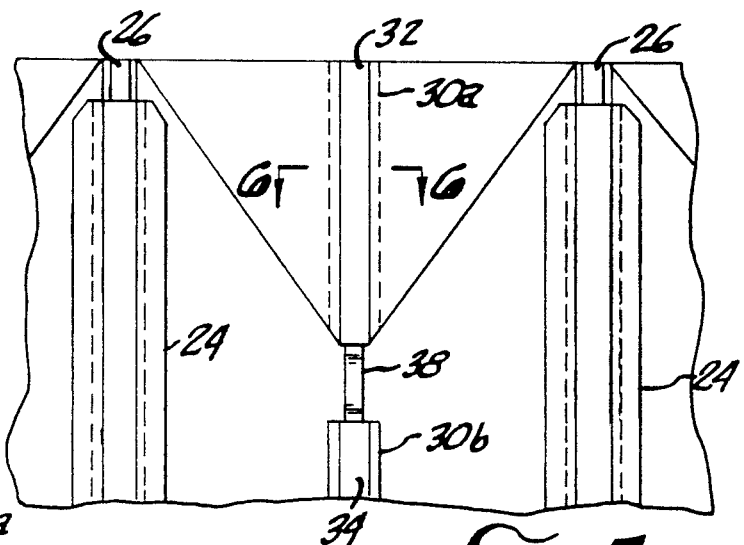
FIG. 5 illustrates the triangular shaped upper stiffener portion of the flexible side wall.
Figure 4:
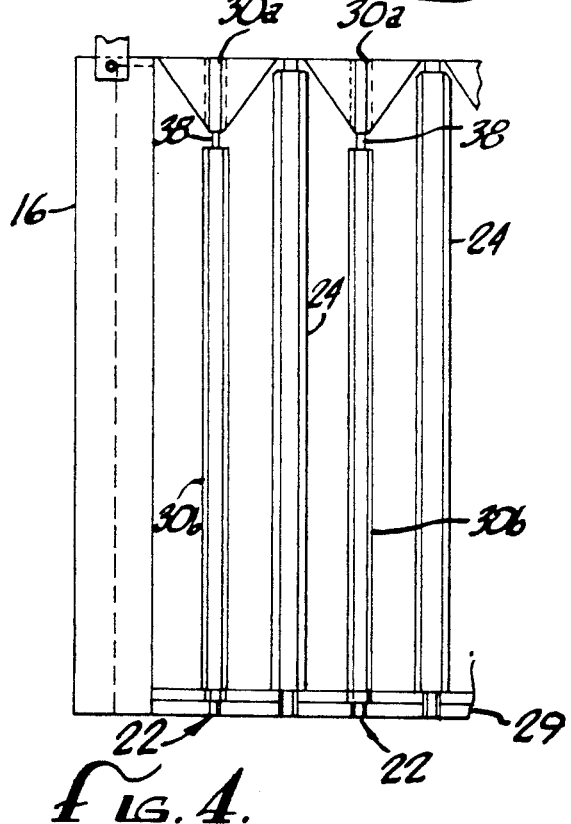
FIG. 4 is an elevation view of two panels of the flexible side wall.
Figures 12A, 12B, 12C:
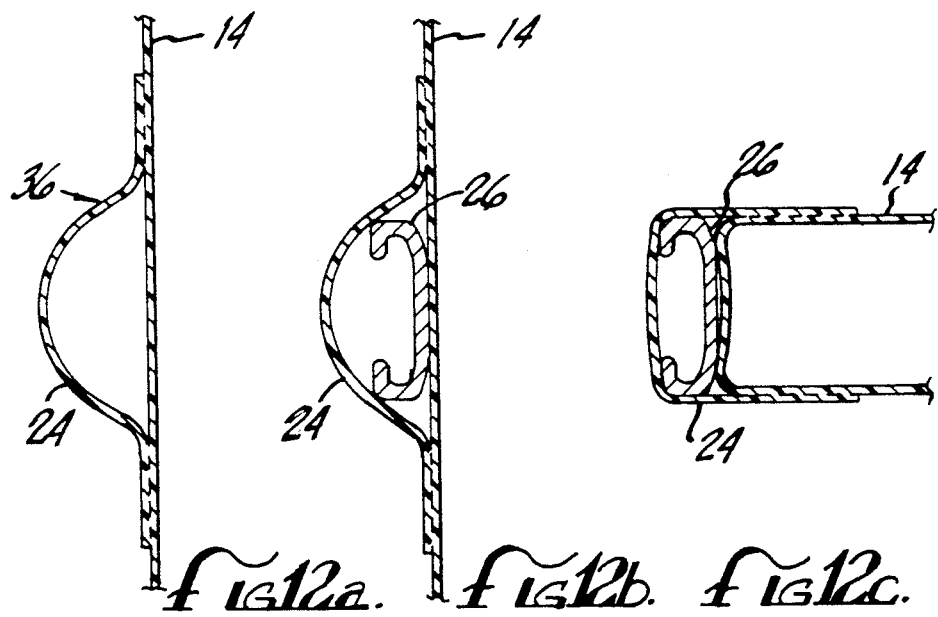
FIGS. 12a, 12b and 12c illustrate the compact folding around the primary pole of the present invention.

Two adjacent panels 22 of the present invention are shown in FIG. 4 attached to the slidable door 16. The vertical primary pole pockets 24 contain the primary poles 26 which extend from the top of the flexible side wall 14 to its bottom. The cross-section of a primary pole 26 and pocket 24 are shown in FIGS. 12a, 12b and 12c. The primary poles 26 support and confine the flexible side wall 14 in a vertical plane along the side of cargo area 12 as each is affixed to a guide 28a which is slidably in a track 28b extending along the top of the open side 18 near the pelmet 20 as shown in FIG. 3. The lower ends of the primary poles 26 are similarly supported and confined in a bottom track 29 extending the length of the cargo area 12. This allows the flexible side wall 14 to conveniently slide into its compacted position in a controlled manner. The slidable door 16 also slides on this track 28b by attached rollers 28c. An upper intermediate pocket 30a houses the upper intermediate pole 32 and the lower intermediate pocket 30b houses the lower intermediate pole 34 as shown in FIGS. 4 through 8. A biasing spring means 38 is positioned between and affixed to the upper intermediate pole 32 and lower intermediate pole 34.

To gain access to the cargo area 12, the user merely unlatches one slidable door 16 from the other (or from a center post 39 if one is provided) and pushes the slidable door 16 along the track 28b. As shown in FIGS. 8a, 8b and 8c, when the flexible side wall 14 is compacted, the biasing spring means 38 urges the upper intermediate pole 32 inward toward the cargo area 12 and urges the lower intermediate pole 34 outward but, in view of the greater length of the lower intermediate pole and its confinement in the long lower pocket 30b, the resultant biased movement occurs in the upper intermediate pole 32 in response to the force of spring means 38. A triangular upper stiffener portion 40 extending laterally from each side of pole 32 folds inward along the biased fold lines 42.

To ensure an orderly, neat fold, the triangular shaped upper stiffener portion 40 is built-up by reinforcing it with the same material comprising the flexible side wall 14. This extra material is welded to the interior surface of the upper stiffener portion 40 to create a thicker area which is triangular in shape in its preferred embodiment to define the desired biased fold lines 42 along its edges. The biasing spring means 38 is positioned at approximately the lower point of this triangular shaped upper stiffener portion 40. The flexible side wall 14 will then neatly fold only along the biased fold lines 42, which run along the edges of this triangular upper stiffener portion 40. In the preferred embodiment, the biased fold lines 42 are aligned between the juncture of the upper intermediate pole 32 and the biasing spring means 38 and a point on the upper edge of the flexible side wall 14 where it meets the edge of the primary pole 26.

Figure 6:
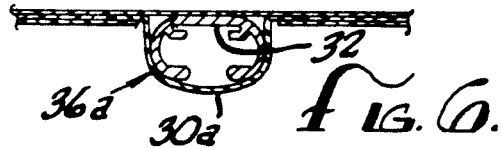
FIG. 6 is a section view taken along line 6—6 of FIG. 5 showing the upper intermediate pole.
Figure 7:
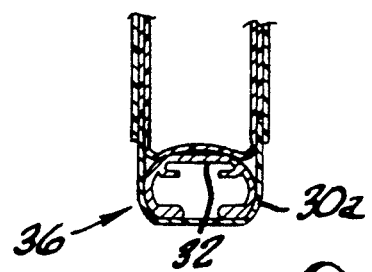
FIG. 7 is a section view similar to FIG. 6, but illustrating the compacted position of the flexible side wall.

A compacted, neatly pleated, flexible side wall 14 is the result in the open position. From a top view, FIG. 10 illustrates this sequence in a schematic fashion. FIG. 8d illustrates the biased spring means 38 of the preferred embodiment. FIG. 9 illustrates the shape of the intermediate pockets 30b and shows the direction of folding movement by arrows "A" of the flexible side wall 14 relative to the pocket 30b. FIGS. 6 and 7 illustrate the folding of the flexible side wall 14 at the intermediate pole 32 and pocket 30a which would be similar at the lower intermediate pocket 30b.

Figures 11A, 11B, 11C:
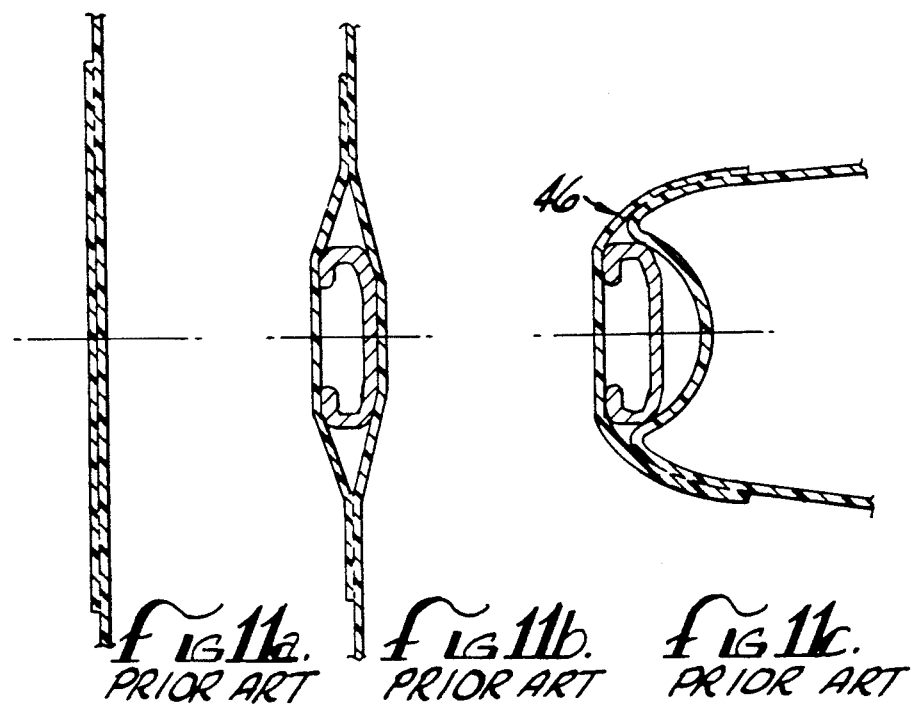
FIGS. 11a, 11b and 11c illustrate a typical form of prior art pocket and its fold along the poles.

The shape and orientation of a primary pocket 24 is shown in FIG. 12 and the relationship to the primary pole 26 during folding of the side wall 14 is shown in FIGS. 12b and 12c. The substantially rounded shape 36 of the primary pole pockets 24 and intermediate pockets 30a and 30b permit the flexible side wall 14 to fold smoothly and compactly without creating any significant wrinkles or extra folds in the material of the side wall 14. FIGS. 11a, 11b and 11c illustrate a typical prior art fold 46 and its problems due to the shape of the prior art pockets.

Figure 13:
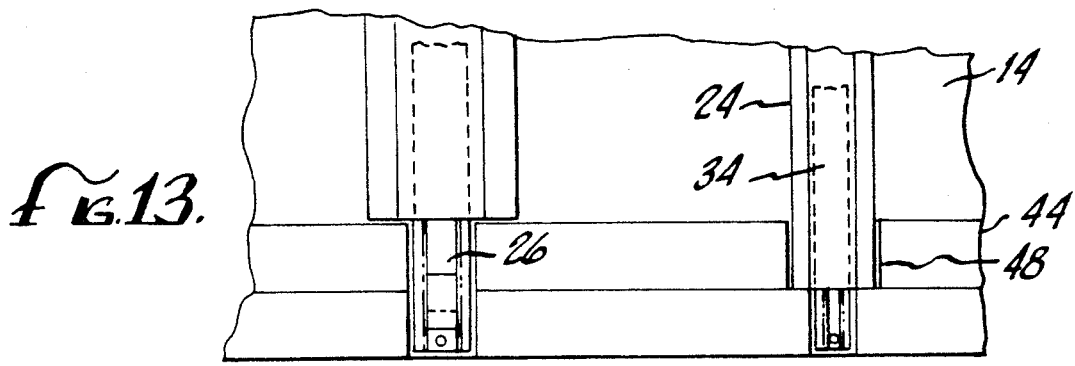
FIG. 13 illustrates the improved hem at the bottom of the flexible side wall of the present invention.

As shown in FIG. 13, a hem 44 is provided at the bottom of the flexible side wall 14 to further protect the cargo in the cargo area 12. The hem 44 is reinforced with stiffeners 48 that do not cross the folds in a manner similar to the upper stiffener portion 40 to provide a further sealing mechanism for the flexible side wall 14 at its base and yet allow compact folding on predetermined folds in the side wall 14.

Thus, an improved flexible side wall construction is disclosed. While specific embodiments and applications of this invention have been shown and described, it will be apparent to those skilled in the art that many modifications are possible without departing from the inventive concepts herein.

What is claimed is:

1. A flexible side construction for a cargo vehicle having at least one open side providing access to the cargo area of said vehicle with a flexible side wall for closing at least a portion of said one open side and having at least one end attached to a slidable door, said flexible side wall including a plurality of horizontally spaced primary pole pockets with each containing a primary pole extending from the top of said flexible side wall to the bottom of said flexible side wall with a panel of the flexible side wall located between each pair of said primary poles, the improvement comprising:

an upper intermediate pocket and a lower intermediate pocket located within said panel;

an upper intermediate pole positioned within said upper intermediate pocket;

a lower intermediate pole positioned within said lower intermediate pocket; and a biasing spring means affixed to and extending between said upper intermediate pole and said lower intermediate pole and biased to urge said upper intermediate pole inward toward said cargo area and to urge said lower intermediate pole outward.

2. The flexible side construction of claim 1 wherein an upper stiffener portion is positioned adjacent to said upper intermediate pole and having at least one biased fold line on said panel extending between said adjacent primary poles and said intermediate pocket for controlling folding of an upper portion of the flexible side wall.

3. The flexible side construction of claim 1 or 2 wherein said flexible side wall is closable by at least one slidable door, wherein said plurality of primary pole pockets are of a substantially rounded shape allowing said flexible side wall to fold in a compact position around said primary pole when said flexible side wall is in a substantially compacted position.

4. The flexible side construction of claim 1 or 2 wherein said intermediate pockets are of a substantially rounded shape allowing said intermediate pocket to wrap in a compact manner about said upper intermediate pole and said lower intermediate pole when said flexible side wall is in a substantially compacted position.

5. The flexible side construction of claim 1 or 2 wherein said upper stiffener panel is substantially triangular and extends on each side of said intermediate pole pocket from substantially the top of each adjacent primary pole to said biasing spring means.

6. The flexible side construction of claim 1 or 2 wherein said pole pockets are of a round shape for allowing the flexible side wall to fold in a substantially compact position.

7. The flexible side construction of claim 1 or 2 wherein said flexible side wall further includes a hem and stiffening means positioned substantially at the bottom of said flexible side wall for reinforcing the hem and causing the hem to fold at predetermined vertical lines.

* * * * *